No. 611,089. Patented Sept. 20, 1898.
T. VON ZWEIGBERGK.
METHOD OF AND MEANS FOR CONTROLLING AND CUTTING OUT ELECTRIC MOTORS.
(Application filed Apr. 29, 1898.)
(No Model.) 2 Sheets—Sheet 1.
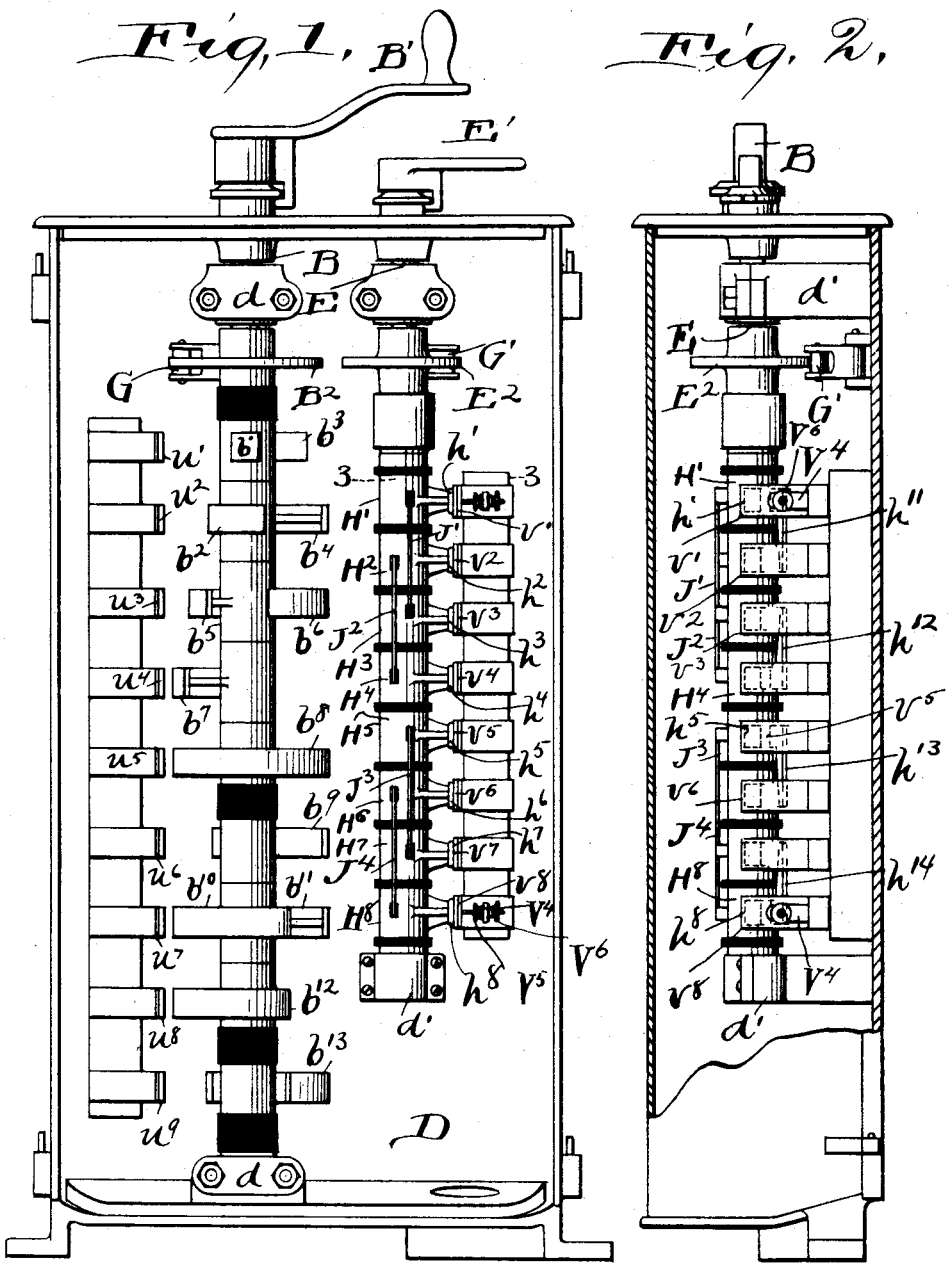

No. 611,089. Patented Sept. 20, 1898.
T. VON ZWEIGBERGK.
METHOD OF AND MEANS FOR CONTROLLING AND CUTTING OUT ELECTRIC MOTORS.
(Application filed Apr. 29, 1898.)
(No Model.) 2 Sheets—Sheet 2.
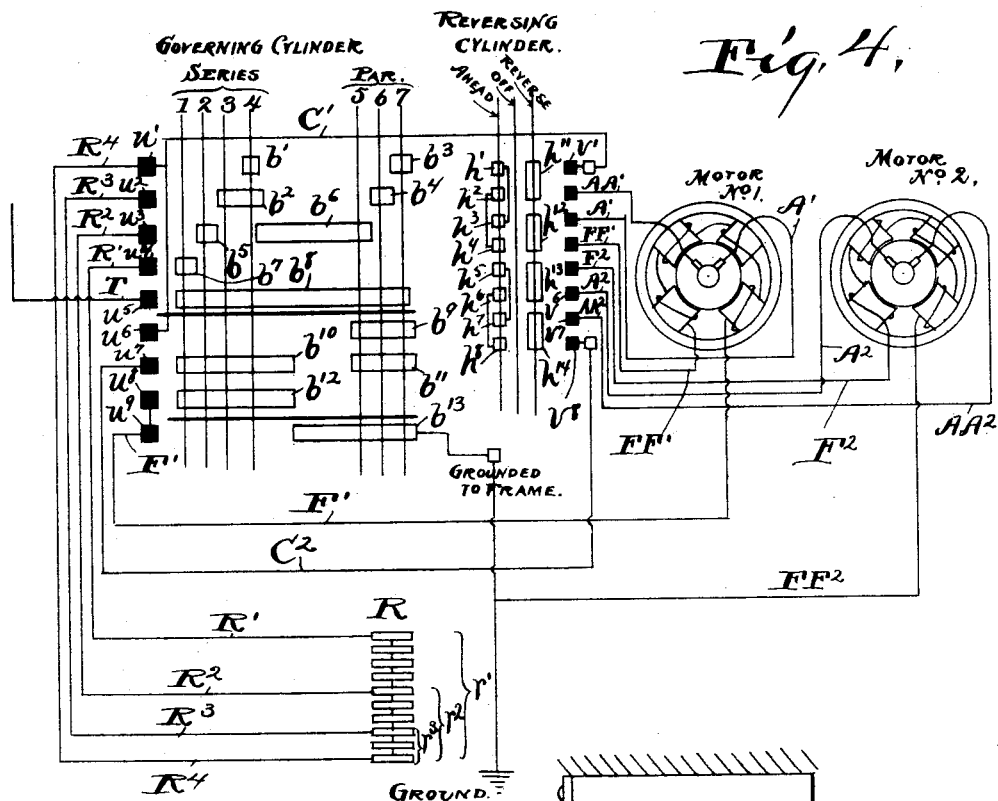
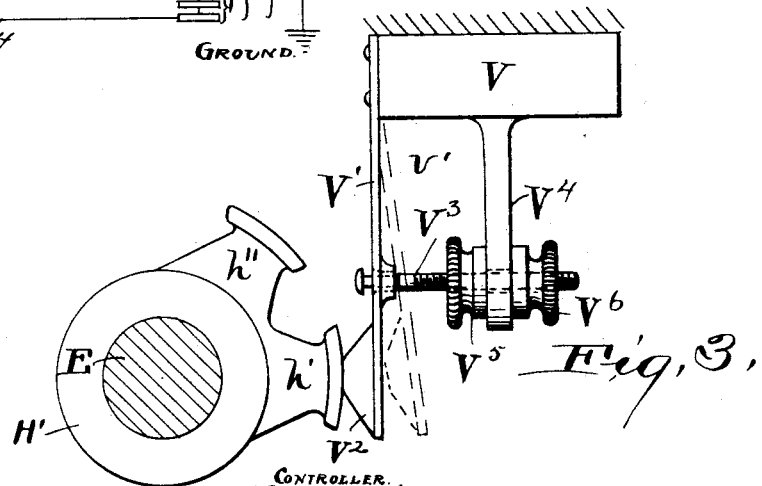
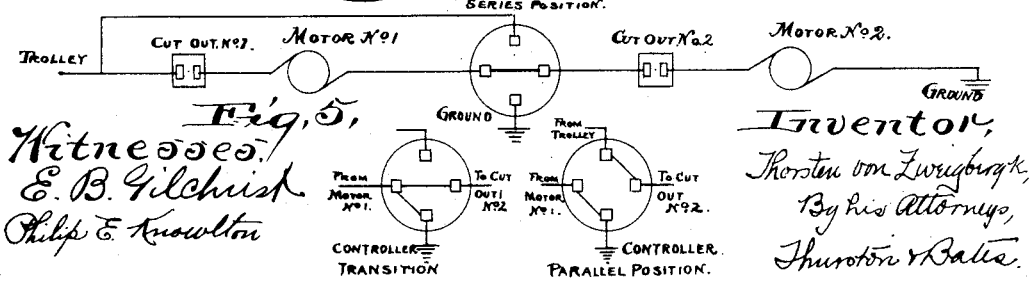
Witnesses:
E. B. Gilchrist
Philip E. Knowlton
Inventor:
Thorsten von Zweigbergk,
By his Attorneys,
Thurston & Bates

UNITED STATES PATENT OFFICE.

THORSTEN VON ZWEIGBERGK, OF CLEVELAND, OHIO, ASSIGNOR TO THE WALKER COMPANY, OF SAME PLACE.

METHOD OF AND MEANS FOR CONTROLLING AND CUTTING OUT ELECTRIC MOTORS.

SPECIFICATION forming part of Letters Patent No. 611,089, dated September 20, 1898.

Application filed April 29, 1898. Serial No. 679,194. (No model.)

*To all whom it may concern:*

Be it known that I, THORSTEN VON ZWEIGBERGK, a subject of the King of Sweden and Norway, residing at Cleveland, in the county of Cuyahoga and State of Ohio, have invented a certain new and useful Improvement in Methods of and Means for Controlling and Cutting Out Electric Motors, of which the following is a full, clear, and exact description, reference being had to the accompanying drawings.

The object of my invention is to provide a method of cutting out one of a plurality of motors, which may be accomplished by operating a single cut-out and with a simple series-parallel controller for governing the motors.

Another object of the invention is to provide an apparatus which when suitably connected up will enable the operator to efficiently and easily carry out this method.

The invention consists, therefore, primarily of the method of controlling and cutting out motors with a series-parallel controller and a cut-out for each motor, which consists in coupling the lines to the motors in series, then grounding the line from the first motor, then opening the series line to the last motor and placing that line on a shunt around the first motor, and at a proper time opening the line to either motor without short-circuiting that motor. This method allows me to cut out either motor of a pair with a single cut-out and control the remaining motor by the parallel positions of the controller. Such method of cutting out a motor and of operating the controller is also my invention.

That part of the invention which resides in the apparatus may be best described as consisting in the combinations of parts hereinafter specified, and definitely set out in the claims.

The drawings illustrate my invention.

Figure 1 is a front elevation of the controller, the front cover being removed. Fig. 2 is a side elevation, partly in section, of the same. Fig. 3 is a horizontal section on the line 3 3 of Fig. 1, the same being on an enlarged scale and showing in detail the cut-out contact-finger. Fig. 4 is a diagram showing the development of the cylinders of the controllers, their contact-fingers, and the connections with the motors and resistance. Fig. 5 is a diagram illustrating my method of going from series to parallel with the controller.

The controller-frame is designated D. It carries suitable bearings $d$, in which is journaled the shaft of the governing cylinder or switch B. This switch carries a series of contact-segments $b'$ to $b^{13}$, inclusive. It is of the series-parallel type, and its arrangement is such that the contact plates or segments $b'$ to $b^8$ are all electrically connected together, and the contact-plates $b^9$ to $b^{12}$ are electrically connected together and insulated from the preceding plates, while the contact-plate $b^{13}$ is insulated from all the others and connected with the controller-frame, which latter is grounded. The governing-controller has the usual operating-handle $B'$ and is normally held in place by a spring-pressed roller G, taking into notches in an ordinary indicator-wheel $B^2$, carried by the shaft. $u'$ $u^9$ represent contact-fingers which are placed in a row by the side of the governing-cylinder and are adapted to contact with the segments thereof.

The shaft of the reversing switch or cylinder is represented by E. It is journaled in suitable bearings $d'$ $d'$, carried by the frame, and has an operating-handle $E'$ and an indicator-wheel $E^2$, engaged by a suitable roller $G'$. This reversing-switch carries eight hubs $H'$ to $H^8$, which surround the shaft and are insulated from each other. These hubs carry a row of contact-segments $h'$ to $h^8$, each hub carrying one segment and each segment being adapted to contact with one of a series of contact-fingers $v'$ to $v^8$. In addition to the segments $h'$ to $h^8$ the reversing-switch also carries four segments $h^{11}$ to $h^{14}$, which are secured to four of the hubs and project over, but do not contact with the proximate hub in each case. These latter segments are wide enough to contact with two consecutive contact-fingers, thus connecting them together. Alternate hubs are connected, as shown, by bars $J'$ to $J^4$, from which connection it results that if the contact-fingers $v'$ to $v^8$ are in engagement with the row of contact-segments $h'$ to $h^8$ alternate fingers are connected together, while if the fingers are in contact with the row of plates $h^{11}$ to $h^{14}$ consecutive fingers are connected together, and thus if the fingers are properly connected with the motors this switch serves to reverse the latter.

In Fig. 4 are indicated the controller, a pair of motors, a resistance, (designated R,) and the connections between them. T represents the line leading from the trolley; $R'$ $R^2$ $R^3$, the lines leading, respectively, to the portions of the resistance designated $r'$—i. e., the whole resistance—the portions $r^2$, and $r^3$; $R^4$, the line leading back to the governing-switch from the resistance. $C'$ $C^2$ represent lines leading from the controller to the reversing-switch. The terminals of the armatures and fields of the two motors are designated, respectively, $A'$, $A$ $A'$, $A^2$, $A$ $A^2$, $F'$, $F$ $F'$, $F^2$, and $F$ $F^2$. As shown, one field-terminal of the first motor $F'$ is connected with the contact-fingers $u^8$ and $u^9$ of the governing-controller, and a field-terminal of the second motor $F$ $F^2$ is permanently grounded. The remaining motor-terminals are connected, as shown, with the fingers $v^2$ to $v^7$, inclusive, of the reversing-switch.

In order to make a simple and efficient cut-out for each motor, I provide the two contact-fingers $v'$ and $v^8$, with which the lines $C'$ and $C^2$ are connected, with means whereby these fingers may be withdrawn out of the path of the contact-segments and maintained in such withdrawn position, thus opening the line $C'$ or $C^2$, as the case may be.

I will now describe in detail the means shown for withdrawing the contact-finger $v'$ or $v^8$ into an inoperative position. This means is shown on an enlarged scale in Fig. 3. There, while $v'$ designates the fingers as a whole, V represents the base of the finger, $V'$ the spring-arm, and $V^2$ the contact-knob carried thereby. The spring-arm normally holds the contact-knob in position to be engaged by the plates of the reversing-cylinder, as shown. Projecting loosely through a hole in the spring is a threaded rod $V^3$. This rod passes loosely through an arm $V^4$, projecting from the base V, and carries on opposite sides of that arm thumb-nuts $V^5$ $V^6$. These thumb-nuts hold the rod $V^3$ in place, while the loose play between that rod and the spring-arm $V'$ prevents the rod interfering at all with the normal operation of the contact-finger. When it is desired, however, to withdraw the contact-finger out of the path of the segments, the thumb-nut $V^5$ is loosened and turned back on the rod $V^3$, and the thumb-nut $V^6$ is screwed up until the finger is drawn backward the desired amount. Then when the thumb-nut $V^5$ bears against the side of the arm $V^4$ the rod $V^3$ is locked tightly in place. The dotted lines in Fig. 3 indicate the position of the spring-arm and contact-knob in the extreme withdrawn position.

I will now describe the course of the current for the different positions of the switches. The drawings show the governing-switch at its off position and the reversing switch at the ahead position. When the governing-cylinder is in position No. 1 series and the reversing-cylinder in the ahead position, the current comes from the trolley via T to contact-finger $u^5$, to contact-plate $b^8$, thence to contact-plate $b^7$, to contact-finger $u^4$, and thence via $R'$ through the total resistance $r'$, thence via the line $R^4$ to the line $C'$ to the cut-out contact-finger $v'$ of the reversing-switch. If this finger be in engagement with the plate $h'$, the current passes to the plate $h^3$, contact-finger $v^3$, through the armature of motor No. 1, thence to contact-finger $v^2$, plates $h^2$ and $h^4$, and through the field of motor No. 1 and back to the controller via the line $F'$. From this point the current passes to the contact-finger $u^8$, through contact-plates $b^{12}$ and $b^{10}$ to the finger $u^7$ and the line $C^2$, and thence to the bottom contact-finger $v^8$ of the reversing-switch. As already stated, this is also a cut-out finger. If it is in contact with the plate $h^8$, the current goes to the plate $h^6$, finger $v^6$, through the armature of motor No. 2 to finger $v^7$, and thence to plates $h^7$ and $h^5$ and through the field of motor No. 2 to the ground. The series positions 2, 3, and 4 simply cut out resistance, leaving the motors in series with the resistance $r^2$ or the resistance $r^3$ or no resistance, respectively.

In passing from the fourth series position to the fifth position, which is the first parallel position, the line from the trolley through the resistance $r^2$ and through the first motor remains intact; but the terminal of the line $F'$ leading from that motor is grounded as the contact-finger $u^9$ engages with the plate $b^{13}$. Shortly after this the contact-finger $u^8$ (connected with the line $F'$) leaves the plate $b^{12}$, thus breaking the connection to the line $C^2$. The current now passes from the trolley, the contact-finger $u^5$, and the plate $b^6$ through the resistance $r^2$ to the contact-finger $u'$ and there divides, passing part directly by the line $C'$ to the first cut-out (i. e., finger $v'$) and part via the other portion of the line $C'$ to contact-finger $u^6$, plate $b^9$, plate $b^{11}$, contact-finger $u^7$, and via the line $C^2$ to the second cut-out $v^8$. From the two cut-outs the current passes through the two motors in parallel and to the ground via the line $F'$, contact-finger $u^9$, and plate $b^{13}$ in the case of the first motor and directly via the line $F$ $F^2$ in the case of the second. The movement of the governing-cylinder to positions 6 and 7 cuts the resistance down to $r^3$ and then cuts it out altogether. If now in these parallel positions either cut-out finger were opened, the current would flow entirely through the other motor, which could thus be run as a single motor on the parallel positions of the controller.

The operation is illustrated in Fig. 5, the upper portion of which shows the course of the current when the motors are in series and the lower portions as it is passing to parallel position and after it has come into such position. First the current passes through the first cut-out to the first motor, then back to the controller, then through the second cut-out to the second motor, and to the ground, the branch line from the trolley to the controller and from the controller to the ground being out of use. In the transition to the parallel position the line from the first motor is connected with the ground at the controller, and as the controller moves into the parallel position the line to the second cut-out is connected with the trolley instead of with the first motor. Thereafter either motor may be cut out by simply opening its cut-out. If four motors are used, the controller may operate to connect them first in series, then two sets of two each in parallel, and then all four in parallel. If at the second stage the first or third cut-out were opened, then either set would be cut out, a set thus corresponding exactly to a single motor, as shown herein. In the last stage any one of the four motors might be cut out simply by opening its cut-out.

I do not intend to limit myself to any particular number of motors so long as the essentials of my operation are followed.

Having described my invention, I claim—

1. The method of operating an electric system including two motors, and a series-parallel controller, when one of the motors is burned out, which consists in coupling the motors in parallel, opening the line to the burned-out motor without connecting that line with anything else, and operating the remaining motor on the parallel positions of the controller, whereby a single cut-out for each motor becomes sufficient and locks limiting the movement of the controller are unnecessary.

2. The combination of a series-parallel governing-switch, two lines leading from the governing-switch to the reversing-switch, and a cut-out in each of these lines, said cut-out being adapted to open the line without connecting it with any other line, and means for holding the cut-out in this open position, substantially as described.

3. A controller which is adapted to connect motors in series and in going from series to parallel grounds the first motor then opens the series line to the last motor and places that motor on a shunt around the first motor, in combination with two motors, two lines leading to the same from the controller, and an independent cut-out in each line adapted to open that line and adapted to remain in a position where it does not connect the line with any other line, whereby a single cut-out for each motor becomes sufficient and locks limiting the movement of the controller are unnecessary, substantially as described.

4. A reversing-switch, two lines leading therefrom to a series-parallel governing-switch which is adapted at series positions to connect one of said lines with the source of current and the other with a motor and in parallel positions to connect both of said lines with the source of current, in combination with such governing-switch and a cut-out in each of said lines, substantially as described.

5. The combination of a series-parallel governing-switch, two lines leading from the governing-switch to the reversing-switch without passing through a motor or being grounded, and a cut-out in each of these lines adapted to open the same, substantially as described.

6. The combination of a series-parallel governing-switch, a reversing-switch, each of said switches having contact-fingers and a relatively-movable body, two lines each connecting a contact-finger of the reversing-switch with a contact-finger of the governing-switch without passing through a motor, and mechanism for opening each of these lines otherwise than by the movement of the reversing-switch, substantially as described.

7. The combination of a series-parallel governing-switch, a reversing-switch, each of said switches having contact-fingers and a relatively-movable body, two of the contact-fingers of the reversing-switch being connected with certain fingers of the governing-switch, and means for retaining each of said two fingers of the reversing-switch out of the path of the switch-body, substantially as described.

8. The combination of a series-parallel governing-switch, a reversing-switch, two motors, a terminal from one motor leading to the ground, a terminal from the other motor leading to the governing-switch and being adapted to be grounded by it, the other terminals of the motors leading to the reversing-switch, two lines connecting the reversing-switch and the governing-switch, and cut-outs adapted to open said lines, substantially as described.

9. The combination with a controller having a series of contact plates and fingers and a motor suitably connected with the fingers, of mechanism adapted to hold a certain contact-finger out of the path of the plate, and thus cut out the motor, substantially as described.

10. The combination with a movable contact-plate and a contact-finger normally in the path of said plate, of a threaded nut loosely connected with the contact-finger and adapted normally not to interfere with the play of the finger but capable of withdrawing the finger out of the path of the contact-plate, substantially as described.

11. The combination with a movable contact-plate and a contact-finger adapted to normally stand in the path of the plate, of a threaded rod V³, a stationary arm V⁴, and a nut V⁶, said rod being connected with the contact-finger and said nut engaging with the rod and bearing against the arm and thus adapted to withdraw the finger out of the path of the contact-plate, substantially as described.

In testimony whereof I hereunto affix my signature in the presence of two witnesses.

THORSTEN VON ZWEIGBERGK.

Witnesses:
ALBERT H. BATES,
CHAS. W. CHESNUTT.